Patented June 17, 1947

2,422,633

UNITED STATES PATENT OFFICE 2,422,633

DISPERSIONS

Boerge Petersen, Juelsminde, Denmark; vested in the Attorney General of the United States No Drawing. Application August 16, 1937, Serial No. 159,323. In Great Britain August 18, 1936

Sections 3 and 14, Public Law 690, August 8, 1946.
Patent expires August 18, 1956

17 Claims. (Cl. 99—123)

This invention relates in general to improved dispersions, having an aqueous disperse phase and organic substance as the continuous phase and to dispersion improving substances. It relates more specifically to improved edible dispersions, such as margarine and shortenings and to substances improving those edible dispersions.

The main object of the invention is to improve the stability of dispersions of the so-called water-in-oil type, that is to say dispersions having an aqueous disperse phase and oils or fats or other suitable organic substances, which may be oleaginous or nonoleaginous, as the continuous phase.

Another object of the invention is to improve the degree of dispersion of the aqueous phase in water-in-oil dispersions.

A further object of the invention is to improve the stability and the degree of dispersion of water-in-oil dispersions having an acid reacting aqueous disperse phase.

Still a further object of the invention is to improve the stability of edible water-in-oil dispersions, such as margarine and shortenings.

Still another object of the invention is to improve the frying and baking qualities of margarine and shortenings.

Other objects and features of the invention will be apparent from a consideration of the following detailed description.

In the art of making dispersions of the water-in-oil type the stability of these dispersions is not only dependent upon the kind and amount of dispersing agent and stabiliser employed but also upon several other factors, such as the degree of dispersion of the aqueous liquid, the reaction of the aqueous liquid, the amount and character of the dry substance present in the aqueous liquid, the method and apparatus employed for making and if necessary cooling the dispersion, and in case of plastic dispersions the method and apparatus employed for kneading the dispersion. It is therefore very difficult if not impossible, to obtain from the same raw materials dispersions of exactly the same kind and composition, which are stable during their transport and storage, when these dispersions are made in different factories or even at different times in the same factory. Already very slight changes of the above mentioned factors may change the appearance and stability of the dispersions.

These disadvantages are avoided or lessened and dispersions of great stability and with a highly dispersed aqueous phase are obtained according to this invention, which consists in using as dispersing agent and/or stabiliser a condensation product of higher fatty acid, with more than 8 carbon atoms in the molecule, such as stearic, palmitic, oleic, linolic, linoleic and linolenic acids or their mixtures, and polysaccharide, such as starch, dextrine, cellulose or degradation products thereof of a polysaccharide type. The improvement according to the invention is especially noticeable, when the water or aqueous solution dispersed in the organic substance has an acid pH value, such as for example acidified skimmed milk, as used in the manufacture of margarine, in order to obtain a better quality of margarine.

The improvement according to the invention is obtained with all the condensation products of polysaccharide and higher fatty acid, but those condensation products, which can be dissolved colloidally or molecularly in the organic substance, such as vegetable or animal oils, fats, fatty acids, waxes, alcohols, hydrocarbons and the like or mixtures of the same, forming the continuous phase of the dispersion, are especially suitable. The solubility of the condensation products in organic substances, especially animal, vegetable or mineral oils and/or fats, seems to depend upon the amount of fatty acid present in the condensation product, in such a manner that the solubility increases with increasing amounts of fatty acid present. The dispersing and stabilising action of the condensation products also seems to depend upon the amount of fatty acid present in the condensation product, but there is apparently a critical point, above which it is not an advantage to increase the amount of fatty acid. This point lies at about 60% fatty acid with a condensation product made from stearic acid and starch and in this case there should be free hydroxy groups of the polysaccharide present in the condensation product. It is in many cases of advantage to employ a condensation product, in which not all the hydroxy groups of the polysaccharide are substituted by fatty acid, these free hydroxy groups apparently having a favourable influence upon the dispersing and stabilising properties of the condensation products.

The invention is not limited to the use of the condensation products described alone as dispersion improving agents. Other dispersing and stabilising agents, such as oleaginous emulsifiers and stabilisers which form stable emulsions of the water-in-oil type, such as the emulsifiers prepared by polymerisation and/or oxidation of oils, fats or their mixtures may be used in combination with the condensation products.

The condensation products may also be used for stabilising dispersions of water or aqueous liquids in organic substances, which dispersion may contain other emulsifiers and/or stabilisers. In this case the stabilisation is carried out by distributing in the dispersion or dissolving in the dispersion, especially in the continuous phase, condensation products of higher fatty acid and polysaccharide, if desired in admixture with other emulsifiers and/or stabilisers.

The manufacture of the condensation products of higher fatty acid and polysaccharide is carried out by the usual methods, such as heating polysaccharide and fatty acid halide, especially chloride, in the presence of inert liquids, such as pyridine, or by reacting fatty acid with polysaccharide in presence of mono-chloro-acetic-acid-anhydride.

It is preferable to dissolve the condensation products in oleaginous substances, especially edible vegetable oils, and to use this solution, which may be a molecular or colloidal one, as dispersion improving substance.

The following examples serve to illustrate how the dispersions of this invention are produced:

1. 5 to 15 parts of a condensation product of dextrine and stearic acid, which condensation product contains about 60% stearic acid, are dissolved in 1000 parts of a fat mixture consisting of cotton seed oil, cocanut oil and the like, and 200 parts of skimmed milk, acidified in the usual manner with the aid of bacteria, are dispersed in the melted fat mixture. Salt, colouring, aromatic and other suitable substances may be added, after which the finished dispersion is cooled and kneaded in the usual manner. The condensation product employed has such water-binding properties, that the margarine obtained is "dry," that is to say, it loses no water during its manufacture, transport and storage. As the water content does not change, the margarine always contains the desired amount of water, corresponding to the amount of water dispersed in the oil and/or fat.

The method employed for making, cooling and kneading the dispersion, the acidity of the skimmed milk, the amount of dry substance contained in the skimmed milk, and other factors, do not influence the dryness of the margarine, when employing a dispersion improving substance according to this invention.

The margarine obtained according to the example has other advantages, which appear to be due to the condensation product employed. Thus for example the colour and the taste of the margarine is not or only slightly influenced by light and air. The margarine also has good frying qualities. It does not spatter or only spatters slightly under normal frying conditions and it does not bake onto the bottom of the frying pan. The colour of the condensation product employed being white, the presence of this substance in the margarine has no influence upon the colour of the margarine. The condensation product employed is also not decomposed by the bacteria present in the margarine, that is to say in the dispersed acidified skimmed milk. The condensation product employed is made from edible substance and is itself edible.

2. The same condensation product as described in Example 1 may also be used for making shortenings for bakery purposes, by dispersing water or other aqueous liquids in edible oils and/or fats. In this case the amount of dispersed aqueous liquid may be much higher than in margarine, for example 20-70%. The procedure may be the same as in Example 1.

3. 50 parts of water, containing perfume and, if desired, substances of cosmetic value, are dispersed in a mixture of 10 parts of vaseline, 10 parts of olive oil, 15 parts of wax, 10 parts of ceresine and 5 parts of the condensation product employed in Example 1. The resulting dispersion is cooled.

The term "higher fatty acid" as used in the claims, is employed to designate fatty acids with at least 8 carbon atoms in the molecule and the term "condensation product" to designate reaction products of polysaccharide and fatty acid, in which one or several hydroxy groups of polysaccharide are replaced by fatty acid, which reaction products also may be called esters.

Although the present invention has been described in conjunction with preferred embodiments thereof, it is to be understood that variations and modifications may be made as those skilled in the art will readily understand. Such variations and modifications are to be considered within the scope of the specification and the purview of the appended claims. Thus, the term "polysaccharide" as used herein is to be understood to apply to those natural colloids, such as starch and cellulose, which as Pringsheim states in "The Chemistry of the Saccharides," (1932), page 119, are quite unlike sugars and which Pringsheim calls polysaccharides of the second order. These natural colloids are also known in the art as "sugar dissimilar polysaccharides." Accordingly, it is understood in the art that terms "polysaccharides of the second order" and "sugar dissimilar polysaccharides" exclude sugars.

I claim:

1. A margarine dispersion including an aqueous disperse phase and a continuous phase consisting of edible fatty acid glyceride, and having included therein a proportion of a condensation product of higher fatty acid and polysaccharide of the second order, said condensation product having at least one hydroxy group of said polysaccharide of the second order free.

2. A margarine dispersion including an acid reacting aqueous disperse phase and a continuous phase consisting of edible fatty acid glyceride, and having included therein a proportion of a condensation product of higher fatty acid and sugar dissimilar polysaccharide, said condensation product having at least one free hydroxy group of said polysaccharide.

3. A margarine dispersion including an aqueous disperse phase and a continuous phase consisting of edible fatty acid glyceride, and having included in said fatty acid glyceride a proportion of a condensation product of higher fatty acid and sugar dissimilar polysaccharide, said condensation product having at least one free hydroxy group of said sugar dissimilar polysaccharide.

4. A margarine dispersion including an acid reacting aqueous disperse phase and a continuous phase consisting of edible fatty acid glyceride, and having included in said fatty acid glyceride a proportion of a condensation product of higher fatty acid and polysaccharide of the second order, said condensation product having at least one free hydroxy group of said polysaccharide of the second order.

5. A margarine dispersion including an aqueous disperse phase and a continuous phase consisting of edible fatty acid glyceride, and having included therein a proportion of a condensation product of higher fatty acid and edible sugar dissimilar polysaccharide, said condensation product having at least one hydroxy group of said edible poly saccharide free.

6. A margarine dispersion including an aqueous disperse phase and a continuous phase consisting of edible fatty acid glyceride, and having included therein a proportion of a condensation product of higher fatty acid and starch, said condensation product having at least one free hydroxy group of said starch.

7. A margarine dispersion including an aqueous disperse phase of cultured skimmed milk and an oleaginous continuous phase of edible fatty acid glyceride, and having included in said fatty acid glyceride a proportion of a condensation product of higher fatty acid and starch, said condensation product having free hydroxy groups of said starch.

8. An edible dispersion including an aqueous disperse phase and an edible oleaginous continuous phase, and having included therein a proportion of a condensation product of higher fatty acid and polysaccharide of the second order, said condensation product having at least one hydroxy group of said polysaccharide free.

9. A dispersion including an aqueous disperse phase and an oleaginous phase, and having included therein a proportion of a condensation product of higher fatty acid and poly saccharide of the second order, said condensation product having at least one hydroxy group of said polysaccharide free.

10. A dispersion including an aqueous disperse phase and substantially water-insoluble oleaginous material selected from the group consisting of vegetable oils, animal oils, fats, fatty acids, waxes, alcohols, hydrocarbons and the like and mixtures thereof as the continuous phase, and having included therein a condensation product of higher fatty acid and polysaccharide of the second order, said condensation product having at least one hydroxy group of said polysaccharide free.

11. A dispersion including an aqueous disperse phase and substantially water-insoluble oleaginous material selected from the group consisting of vegetable oils, animal oils, fats, fatty acids, waxes, alcohols, hydrocarbons and the like and mixtures thereof as the continuous phase, and having included in said continuous phase a condensation product of higher fatty acid and polysaccharide of the second order, said condensation product having at least one free hydroxy group of said polysaccharide of the second order.

12. A dispersion including an acid reacting aqueous disperse phase and substantially water-insoluble oleaginous material selected from the group consisting of vegetable oils, animal oils, fats, fatty acids, waxes, alcohols, hydrocarbons and the like and mixtures thereof as the continuous phase, and having included in said continuous phase a condensation product of higher fatty acid and polysaccharide of the second order, said condensation product having at least one free hydroxy group of the polysaccharide of the second order.

13. A dispersion improving substance, consisting of a solution of a condensation product of higher fatty acid and sugar dissimilar polysaccharide in an oleaginous substance, said condensation product having at least one hydroxy group of said polysaccharide free.

14. A dispersion improving substance, consisting of a solution of a condensation product of higher fatty acid and sugar dissimilar polysaccharide in an oleaginous substance, said condensation product having at least one free hydroxy group of said sugar dissimilar polysaccharide.

15. A dispersion improving substance consisting of a solution of a condensation product of higher fatty acid and poly saccharide of the second order in an edible oleaginous substance, said condensation product having at least one hydroxy group of said polysaccharide free.

16. A dispersion improving substance consisting of a solution of a condensation product of higher fatty acid and polysaccharide of the second order in an edible oleaginous substance, said condensation product having at least one free hydroxy group of said polysaccharide of the second order.

17. Margarine in the form of a plastic emulsion of oleaginous and aqueous materials, the oleaginous material constituting the continuous phase, containing a proportion of an emulsifying agent in the form of starch incompletely esterified with a higher molecular weight fatty acid.

BOERGE PETERSEN.

REFERENCES CITED

The following references are of record in the file of this patent:

UNITED STATES PATENTS

| Number | Name | Date |
|---|---|---|
| 1,917,249 | Harris | July 11, 1933 |
| 1,896,002 | Lant | Jan. 31, 1933 |
| 1,981,292 | Todd | Nov. 20, 1944 |
| 2,137,667 | Eipper | Nov. 22, 1938 |